United States Patent [19]

McLaughlin et al.

[11] Patent Number: 4,975,694

[45] Date of Patent: Dec. 4, 1990

[54] PAGING RECEIVER WITH VARIABLE COLOR INDICATORS

[75] Inventors: Kevin T. McLaughlin, Lake Worth; Michael J. DeLuca, Boca Raton, both of Fla.

[73] Assignee: Motorola, Inc., Schaumburg, Ill.

[21] Appl. No.: 322,876

[22] Filed: Mar. 14, 1989

[51] Int. Cl.[5] .............................................. H04Q 7/00

[52] U.S. Cl. .............................. 340/825.44; 340/701; 340/311.1

[58] Field of Search ................ 340/311.1, 825.44, 701, 340/781, 782, 702, 703, 716, 784, 815.03, 815.1, 332; 455/38

[56] References Cited

U.S. PATENT DOCUMENTS 4,704,608 11/1987 Sato et al. ........................ 340/311.1

4,851,829 7/1989 DeLuca et al. ................ 340/825.44

FOREIGN PATENT DOCUMENTS 51-158343 11/1976 Japan .

OTHER PUBLICATIONS

RC101 Numeric Display Radio Paging Receiver Copyright 1987, Motorola 68P81052C45-0, "PMR 2000" Series POCSAG Alphanumeric Display Personal Message Receiver 68P81051C05-A.

*Primary Examiner*—Donald J. Yusko

*Assistant Examiner*—Peter S. Weissman

*Attorney, Agent, or Firm*—William E. Koch; Vincent B. Ingrassia

[57] ABSTRACT

A paging receiver has an indicator capable of illluminating in one of a plurality of colors. The color of illumination is selected in response to the address received by the pager. The indicator identifies the address by the color illuminated. The indicator also indicates weather a message is protected, read, about to be protected or about to be deleted by the color and color sequence of the indicator. The color indicator also indicates if the paging receiver is about to be turned off. The indicator may also serve as a back-light for a display when the paging receiver includes a display. Signals within the information to be displayed may change the color or change the intensity of the back-light, these signals may also turn the back-light off or on.

13 Claims, 6 Drawing Sheets

PAGING RECEIVER WITH VARIABLE COLOR INDICATORS

BACKGROUND OF THE INVENTION

This invention relates generally to visual indicators used in the operation a paging receiver including reading messages received by the paging receiver. In particular, this invention relates to the changing of the colors of visual indicators in response to addresses received by the paging receiver, the operating state of the pager and the status of messages displayed on the display of a paging receiver.

As the features and functions of paging receivers evolve and increase, it becomes increasingly difficult for the user of a pager to comprehend the operations of the pager. For example, a pager operating on the POCSAG paging protocol has four specified alert patterns, one alert pattern for each of four functions associated with an address assigned to the pager. This alert sequence would adequately provide for alerting one address having up to four functions. As the capabilities and functions of a pager increase, it becomes desirable to increase the number of four functions addresses beyond a single address. It is also desirable to keep the same alert for each function while distinguishing between addresses.

New pagers have an increasing variety of operations with respect to a message received by the paging receiver. The increasing variety of operations presents the pager user with the more difficult task of remembering and comprehending the new operations. The operations include reading an unread message, rereading a message, protecting a message and deleting a message. Thus it is desirable to provide the user with additional indication of the operation being activated. With the additional indication, the user may more readily comprehend the pager operations.

When a prior art pager has a back-light for illuminating a display, the back-light provides only for the illumination of the display and provides no indication of the message content. Thus it would be desirable to operate the back-light in response to the message content.

The Motorola PMR 2000 pager and the NTT RC-101 numeric pager are prior art pagers which possess the aforementioned operating characteristics. A description of the operating characteristics may be found in the operational descriptions of these pagers.

SUMMARY OF THE INVENTION

It is therefore an object of the present invention to provide a means for resolving the aforementioned issues.

It is another object of the present invention to provide a visual alert means which changes color in response to the address received by the paging receiver.

It is yet another object of the present invention to provide a visual alert means which changes color in response to the pager operation being activated.

It is yet another object of the present invention to modify the color of a back-light in response to a signal within a message received by the paging receiver.

It is yet another object of the present invention to reactivate and deactivate the back-light in response to signals within the message received by the paging receiver.

It is yet another object of the present invention to vary the intensity of the back-light in response to signals within the message received by the paging receiver.

In accordance with the present invention, a paging receiver comprises a receiving means for receiving and decoding an address wherein the paging receiver has at least one predetermined address with a color sequence associated with the address, said receiving means generating a detect signal in response to the reception of the predetermined address. The paging receiver further comprises an illuminating means for illuminating a plurality of colors wherein said illuminating means being responsive to the detect signal generates a visual alert signal having the color sequence associated with the detected address.

In further accordance with the present invention, a paging receiver comprises a receiving means for selectively receiving a message having at least one of a plurality of illumination signals. The paging receiver further comprises a display means for readably displaying the message, and an illuminating means for illuminating in response to the at least one illumination signal.

DESCRIPTION OF A PREFERRED EMBODIMENT

Figure 1:
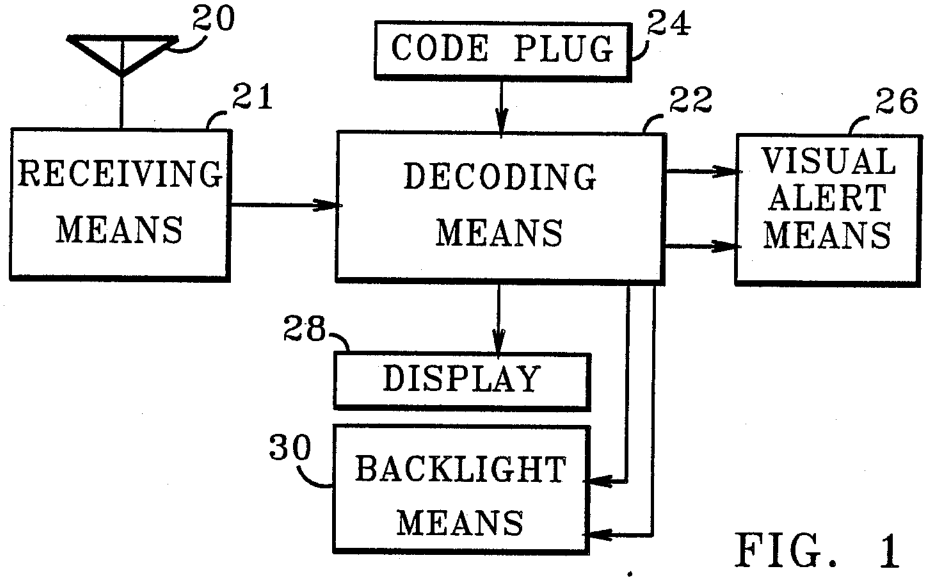
FIG. 1 shows a block diagram of a paging receiver operating in accordance with the present invention.

FIG. 1 shows a block diagram of a paging receiver operating in accordance with the present invention. A paging signal is received by antenna 20 and processed by receiving means 21, which includes circuitry for demodulation and detecting radio frequency information. The detected information is processed by decoding means 22, which decodes address and other information within the paging signal. The construction of receiving means 21 and decoding means 22 is well known to those familiar with the art. Decoding means 22 may be constructed with a Motorola MC146805H2 microcomputer, which is the preferred microcomputer of the invention. Decoding means 22 includes a memory for storing messages received by the paging receiver wherein a message has one of a plurality of statuses including the read and protect status. Decoding means 22 also includes a means for assigning one of a plurality of statuses to the message. Such means are disclosed in U.S. Pat. No. 4,851,829 to DeLuca et al. which is hereby incorporated by reference. Coupled to the decoding means is a code plug 24 which includes at least one predetermined address assigned to the paging receiver. Also coupled to decoding means 22 is a first illuminating means, visual alert means 26, which generates a plurality of colors. Visual alert means activates in response to the reception of an address matching an address in code plug 24 as well as various operating modes of the paging receiver. Also coupled to decoding means 22 is display means 28 which displays messages received after the paging address of the paging receiver. The messages are typically displayed in an alphanumeric fashion and display means 28 is a liquid crystal display which absorbs light in order to display readable characters. Display means 28 also includes indications as to the user operation or status of the pager. User operation of the pager corresponds to changing the state of the pager. A second illuminating means, back-lighting means 30, is also coupled to decoding means 22 and is capable of back-lighting the display means in one of a plurality of colors. The colors selected for the back-lighting means may be made in response to either the status of the pager or in response to signals included within the received message.

Figure 2:
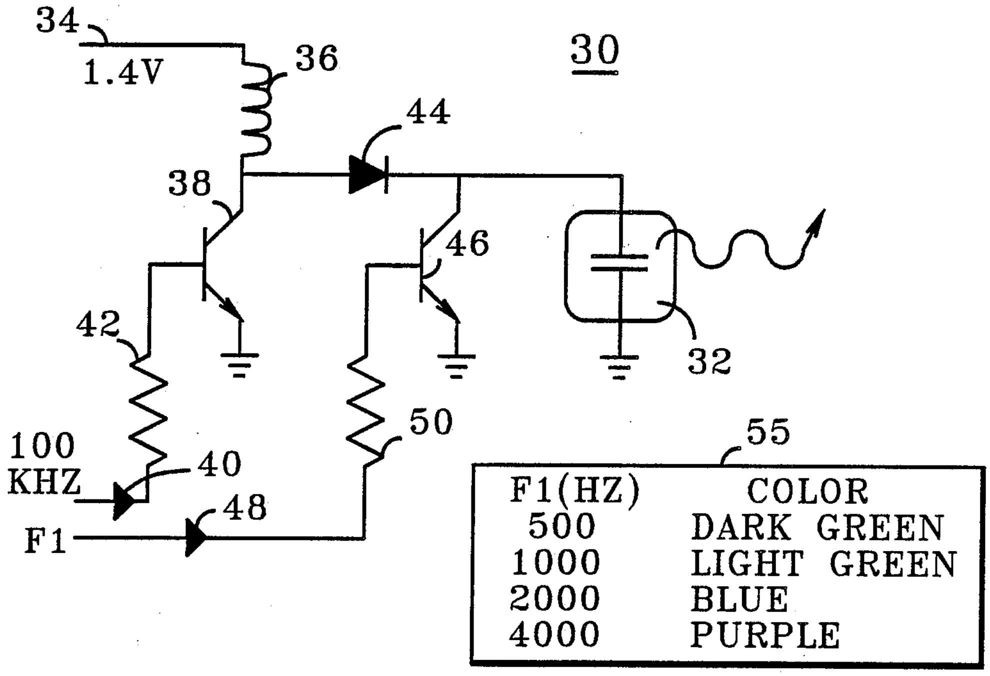
FIG. 2 shows a circuit schematic of a back-lighting means.

FIG. 2 shows a circuit of implementation of back-lighting means 30. The back-lighting means includes an Electroluminescent Lamp (EL) panel 32 which is driven by a voltage multiplying means known to those familiar with the art. The voltage multiplying means is supplied by a 1.4 volt signal 34, which is available at one terminal of inductor 36. The other terminal of the inductor is coupled to a switching transistor 38 which switches off and on at a rate substantially equal to 100 kHz. The base of the transistor 38 is driven by a 100 kHz signal 40, through current limiting resistor 42. The collector of transistor 38 is also coupled to a rectifying diode 44.

By switching transistor 38 with a 100 kHz signal a large voltage is developed by inductor 36 and rectified by diode 44. This large voltage is then made available to the EL panel 32 which illuminates in response to the voltage. The color of the EL panel may be varied by switching transistor 46 at various frequencies. The collector of transistor 46 is coupled to the output of diode 44 and the input to EL panel 32. The base of transistor 46 is driven by a frequency signal 48 through a current limiting resistor 50. It has been experimentally determined that varying the switching frequency of transistor 46 changes the color of the light radiated by EL panel 32. Table 55 shows the colored changes of the EL panel. When the transistor 46 is driven by 500, 1000, 2000, and 4000 Hz frequencies, the EL panel produces dark green, light green, blue and purple light respectively. It should be further noted that the intensity of green light at 1000 Hz is greater than the intensity of green light at 500 Hz.

Means for providing frequency signals 40 and 48 to the back-lighting means is well known to those familiar with the art and may be supplied by outputs from the 146805H2 microcomputer.

Figure 3:
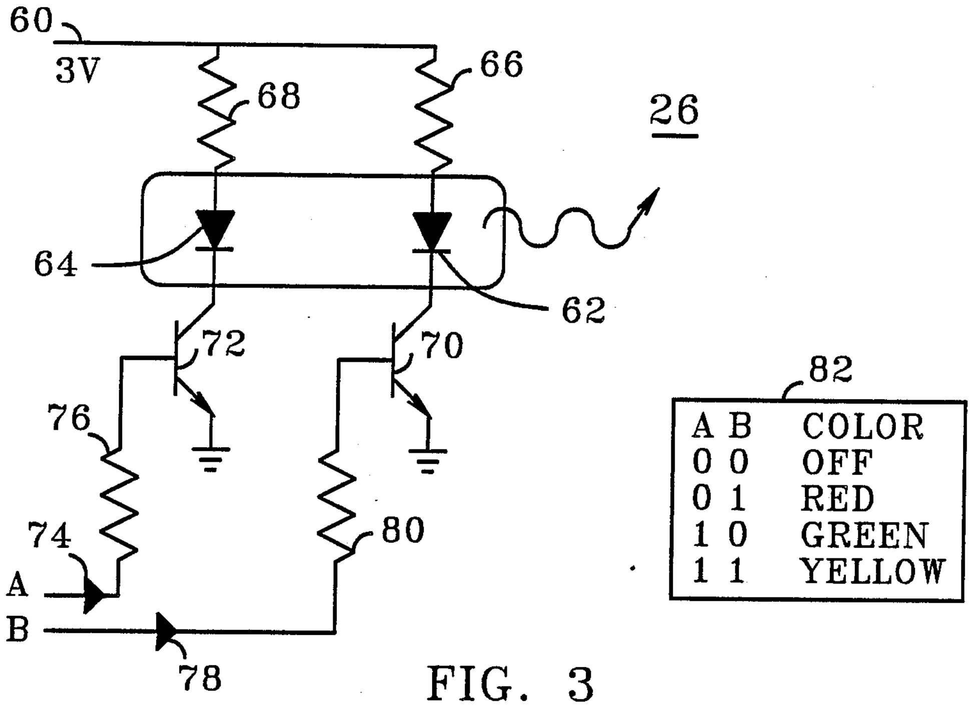
FIG. 3 shows a circuit schematic of a visual alert means.

FIG. 3 shows a circuit schematic of the visual alert means 26. The circuit is supplied with a three volt signal 60 which is generated within the decoding means. Two Light Emitting Diodes (LED) are included with the visual alert means. LED 62 emits a red light when activated, and LED 64 emits a green light when activated. The current through LEDs 62 and 64 are limited by resistors 66 and 68 respectively. The LEDs are activated by transistors 70 and 72 respectively. The A signal 74, switches transistor 72 on through current limiting transistor 76. Likewise, the B signal 78, switches transistor 70 on through current limiting resistor 80. By selectively activating signals A and B four states of the visual alert means may be realized. Table 82 shows the four states. A 00 corresponds to having the visual alert means off. A 01 corresponds to activating LED 62 which results in a red light. A 10 activates LED 64 which results in a green light and a 11 activates both LEDs 62 and 64 which results in a yellow light.

The signals A and B may be generated by input/output ports on the MC146805H2 microcomputer.

Figure 4:
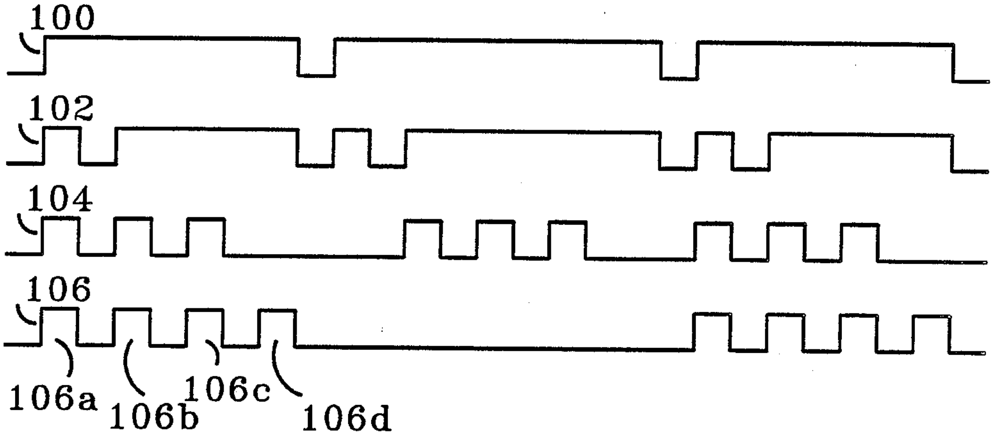
FIG. 4 shows a pager having four alert patterns.

When a pager receives an address, an alert is generated. FIG. 4 shows a pager having four alert patterns. Each pattern corresponding to one of the four functions of the address received. Line 100, 102, 104, and 106 indicates alert patterns for the first, second, third, and fourth functions respectively. For each of the alert patterns the visual alert means activates when the pattern is high and the visual alert means deactivates when the pattern is low.

If a prior art pager had two addresses with each address having four functions, the alert patterns would be generated in the same manner thereby making it impossible for the pager user to distinguish between a function 1 of address 1 and a function 1 of address 2. Although it could be possible to develop different alert patterns for the functions of address 2, it would become very complex and undesirable to require the user of the pager to remember additional alert patterns in order to determine the address of the received message. Thus, in the preferred embodiment the paging receiver keeps the same alert pattern for all four functions and changes the color of the alert in response to the address received.

An alert function 1, line 100, is on for $\frac{7}{8}$, and off for $\frac{1}{8}$ of a second, and this pattern repeats every 1 second thereafter. Alert function 2, line 102, is on for $\frac{1}{8}$, off for $\frac{1}{8}$, on for $\frac{5}{8}$, and off for $\frac{1}{8}$ of a second and this pattern repeats every 1 second thereafter. Alert function 3, line 104, is on for $\frac{1}{8}$, off for $\frac{1}{8}$, on for $\frac{1}{8}$, off for $\frac{1}{8}$, on for $\frac{1}{8}$, and off for $\frac{3}{8}$ of a second and the pattern repeats every 1 second thereafter. Alert function 4, line 106, is on for $\frac{1}{8}$, off for $\frac{1}{8}$, on for $\frac{1}{8}$, off for $\frac{1}{8}$, on for $\frac{1}{8}$, off for $\frac{1}{8}$, on for $\frac{1}{8}$, and off for 9/8 of a second and the pattern repeats every 2 seconds thereafter.

Figure 5:
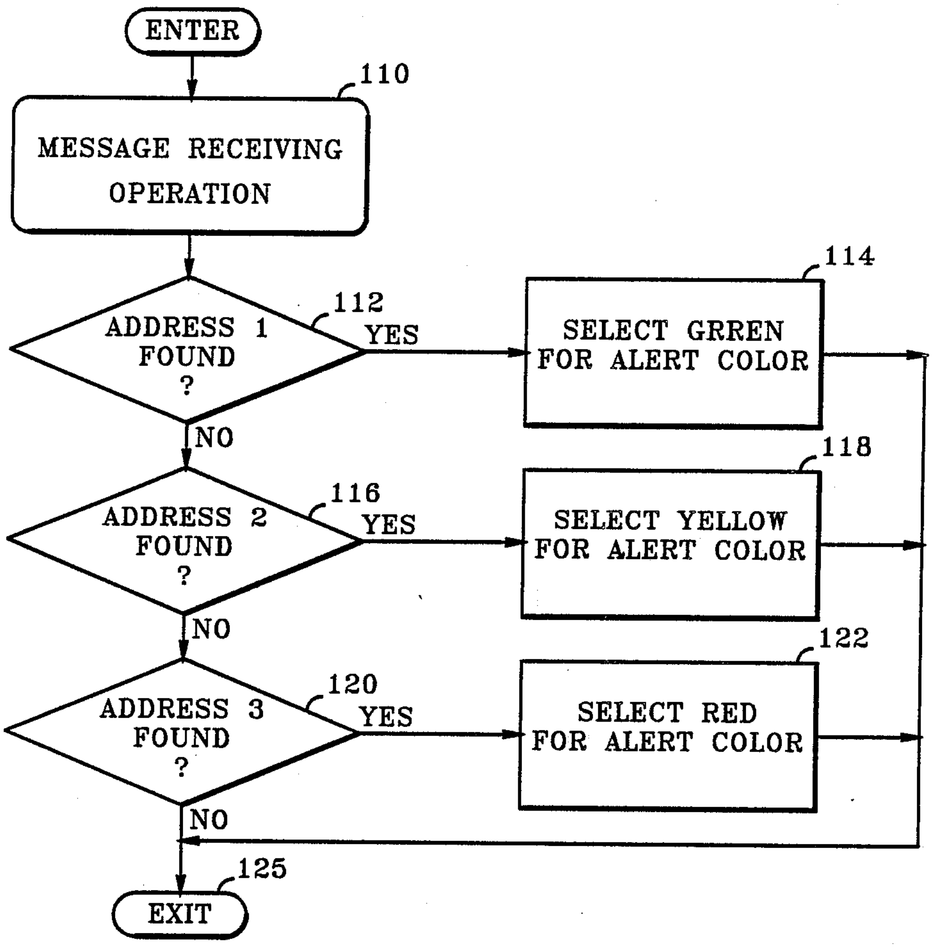
FIG. 5 shows a flowchart for selecting the color of the alert means in response to the reception of an address.
Figure 6:
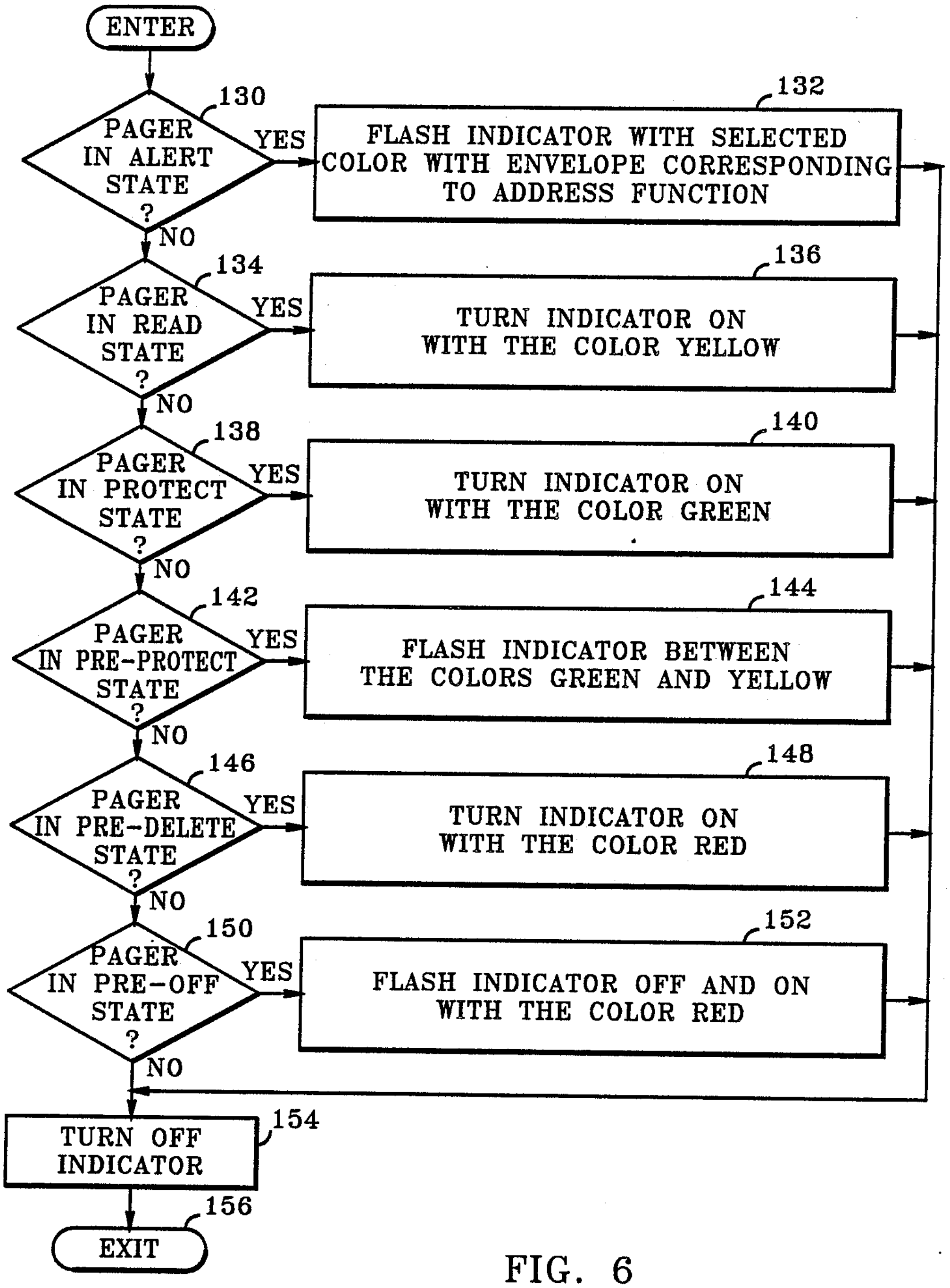
FIG. 6. shows a flowchart for operating the visual alert means in response to the state of the pager.
Figure 7:
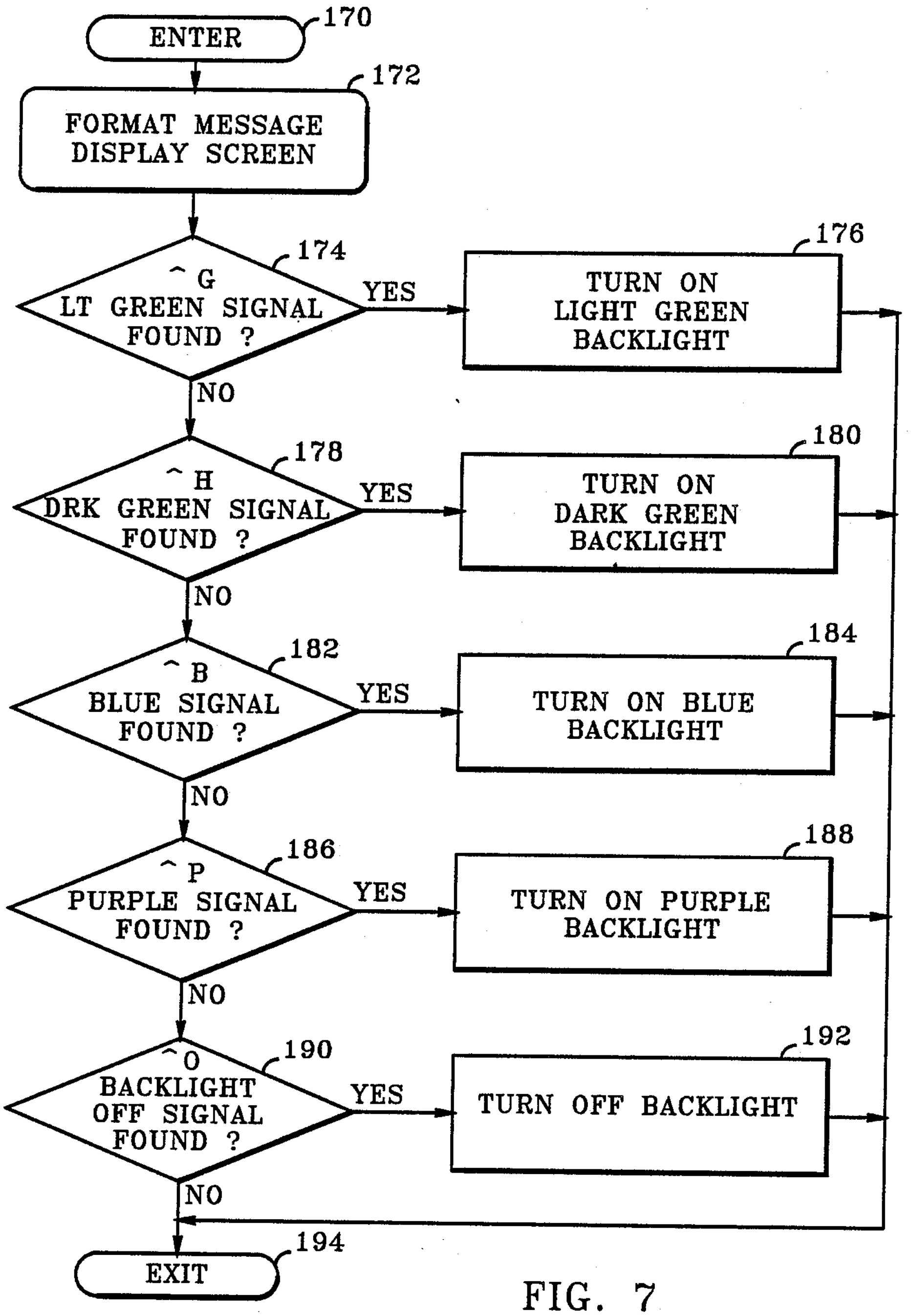
FIG. 7 shows a flowchart for changing the color of the back-light in response to signals found within the message received by the paging receiver.

The flowchart of FIGS. 5, 6 and 7 may be readily incorporated into the structured software operating environment of a paging microcomputer. Such an operating environment has been disclosed in U.S. Pat. 4,755,816 July 5, 1988 to DeLuca, which is hereby incorporated by reference. The description within said patent when combined with the description herein enables one skilled in the art to make and use this invention.

FIG. 5 shows the flowcharts for selecting the color of the alert means 26 in response to the reception of an address. The routine is entered after the message receiving operation 110. Step 112 checks if address 1 is found. If address 1 is found the program proceeds to step 114 to select green for the alert color. If in step 112 address 1 is not found, the program proceeds to step 116 to check address 2 is found. If address 2 was found, the program proceeds to step 118 to select yellow for the alert color. If, in step 116 address 2 is not found the program proceeds to step 120 to check if address 3 was found. If address 3 was found, the program proceeds to program step 122 to select red for the alert color. If in step 120 address 3 was not found as well as in after completion of step 114, 118 or 122, the program proceeds to the exit 125.

Thus, a color for the visual alert means 26 has been selected in response to the address found. When the alert routine is entered, the visual indicator will be modulated with one of the alert patterns shown in FIG. 4 wherein the alert pattern is described by the function of the address received. The color of the alert means will indicate whether address 1, 2, or 3 has been found.

It should be appreciated that another embodiment having more colors can alert more than 3 addresses. It should also be appreciated that more complex methods may be readily developed based on the teachings herein. For example, the color of the visual alert could alternate between 2 or more colors in response to the address. For example, referring back to FIG. 4, if address 1 was found having a function 4, intervals 106A and 106C could illuminate the color red and intervals 106B and 106D could illuminate the color yellow. While if address 2 is found having a function 4, interval 106A could illuminate the color green, interval 106B could illuminate the color yellow, and intervals 106C and 106D could illuminate the color red.

FIG. 6 shows a flowchart for operating the visual alert means 26 in response to the state of the pager. The program enters and begins at step 130 where the alert state of the pager is checked. The alert state is entered in response to the reception of an address. If the pager is in the alert state, the program proceeds to step 132 to flash the indicator with the selected color from the flow chart of FIG. 5, and the pattern corresponding to the function of the address. If the pager is not in the alert state, the program proceeds to step 134 to check if the pager is in the read state. In the read state a user is reading a message already received by the paging receiver, and the message does not have protected or locked status. If the pager is in the read state the program proceeds to step 136 to turn the indicator on with the color yellow. Yellow being indicative of the displayed message having the read status. If the pager is not in the read state the program proceeds to step 138 to check if the pager is in the protect state. In this state, the message being displayed has the protected or locked status. If the pager is in the protect state the program proceeds to step 140 to turn the indicator on with the color green. If the pager was not in the protect state the program checks to see if the pager was in the pre-protect stage 142. The pre-protect state corresponds to an intermediate state which is entered prior to changing the status of a message between the read and protect statuses. If the pager is in a pre-protect state, the program proceeds to step 144 to flash the indicator between the color green and yellow. If not in a pre-protect state, the program proceeds to step 146 to check if the pager is in the pre-delete state. The pre-delete state corresponds to an intermediate state which is entered prior to actually deleting a message If in the pre-delete state, the program proceeds to step 148 to turn the indicator on with the color red. If not in the pre-delete state the program proceeds to step 150 to check if the pager is in the pre-off state. The pre-off state corresponds to an intermediate state which is entered prior to actually turning off the pager. If in the pre-off state the program proceeds to step 152 to flash the indicator on and off with the color red. If not in the pre-off state that program proceeds to step 154 to turn the indicator off. From either step 132, 136, 140, 144, 148, 152, or 154 the program proceeds to 156 to exit.

FIG. 6 shows changing the color of the indicator based upon the state of the pager. Step 132 shows changing the color in response to a received address. Steps 136, 140, 144, and 148 show changing the color in response to the state of the pager which corresponds to the status of a message. The operations include reading the message, protecting the message, being in a pre-protection message state and being in a pre-delete message state. Such states are well known in the art and have been implemented on the Motorola PMR2000 pager as well as the NTT RC-101 pager. Finally step 152 shows changing the color of an indicator in response to the pager being in the pre-off state.

Thus, FIG. 6 shows changing colors of an indicator in response to a received address, the state of the pager while displaying a message and the changing of the power status of the paging receiver. The colors chosen in the preferred embodiment are intended to relate pager states to colors generally associated with traffic signal and other daily encountered phenomena. The color green connotes safety and is associated with the protect state, and a protected message is safe from being deleted. The color yellow, associated with the read message, connotes caution, and the user should be cautious about these messages because the read message may be deleted by another incoming message. The color red connotes danger and is associated with the pre-delete state, and the user should be sure that deleting a message is what is desired. Flashing red which is associated with the pre-off state, connotes a warning to ensure that switching off the pager is what the user actually desires.

It should be appreciated that it is not necessary to actually display the message in order to determine the state of the receiver. In another embodiment where a paging receiver stores a plurality of message, and a messages is selected for display prior to its displaying, the indicator may produce a color indicative of the status of the selected message.

It should be further appreciated that the indicator referred to by FIG. 6 is the visual alert means 26 of FIG. 3 having the colors red, yellow and green. In an alternate embodiment the back-light means 38 of FIG. 2 may be used in FIG. 6 by interchanging the colors green, blue and purple for the colors red, yellow and green. In another embodiment the color of the back-lighting may be modified in response to the state of the pager.

FIG. 7 shows a flowchart for changing the color of the back-light in response to signals found within the message received by the paging receiver. The routine is entered at step 170 wherein at step 172 a message is formatted for display on the screen display means. Displaying one portion of a message on a screen is the preferred method for displaying a message. After formatting the display screen the program proceeds to step 174 to see if a ^G signal, indicating light green, has been found. If found, the program proceeds to step 176 to turn on the back-light with the color light green. If the ^G signal has not been found, the program proceeds to step 178 to see if a ^H signal indicating the color dark green, has been found. If found, the program proceeds to step 180 to turn on the back-light with the color dark green. If the ^H signal has not been found, the program proceeds to step 182 to see if a ^B signal indicating the color blue, has been found. If found, the program proceeds to step 184 to turn on the back-light with the color blue. If the ^B signal has not been found, the program proceeds to step 186 to see if a ^P signal indicating the color purple, has been found. If found, the program proceeds to step 188 to turn on the back-light with the color purple. If the ^P signal has not been found, the program proceeds to step 190 to see if a ^O signal, indicating the back-light is to be off, has been found. If found, the program proceeds to step 192 to turn off back-light. If, in step 190, the back-light signal was not found or from step 176, 180, 184, 188, or 192 the program proceeds to exit the flow chart at step 194.

The light green, dark green, blue, purple, and back-light off signals referred to in FIG. 7 comprise control characters embedded within the message. These control characters are not printed by the screen formatter, but are interpreted by the decisions 174, 178, 182, 186 and 190. These signals may include an ASCII control character followed by a second character indicating the type of back-light control to be used while displaying the portion of the message on the screen.

It should be appreciated that given a single color back-lighting, as is known in the prior art, the invention included in FIG. 7 provides for enabling and disabling the back-lighting, or turning the back-lighting off and on, in response to control signals embedded with the message.

It should be further appreciated that given a green colored back-lighting, the invention included in FIG. 7 when considering only the ^G and ^H signals, shows changing the intensity of the back-lighting, or making the back-lighting darker or brighter, in response to control signals embedded with the message.

It should be still further appreciated that in an alternate embodiment, the signals of FIG. 7 could drive visual alert means 26 thereby changing the color of an indicator in response to the contents of a message.

It should be still further appreciated that although an EL panel is shown to be used for back-lighting, in an alternated embodiment, other illuminating means such as the LEDs of FIG. 3 may be used for back-lighting.

Figure 8:
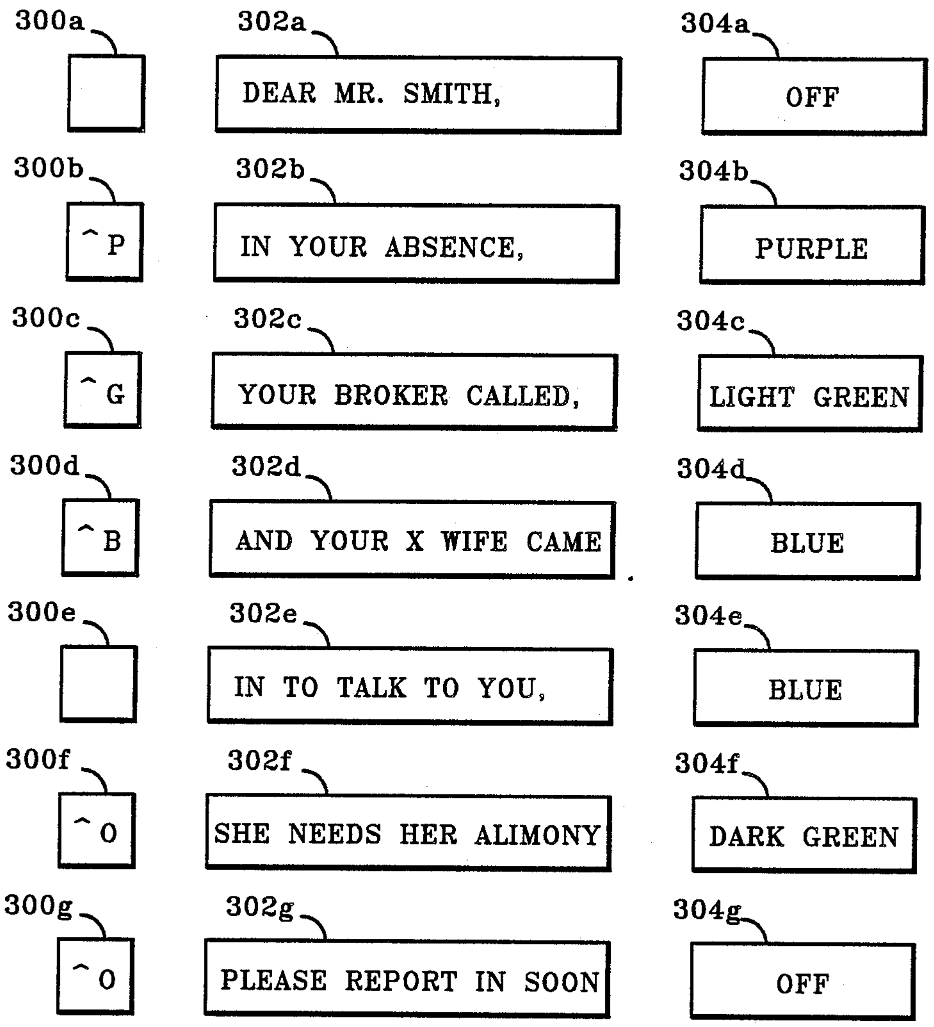
FIG. 8 shows an example of a message being displayed, having a variable color back-light.

FIG. 8 shows an example of a seven screen message being displayed, having a variable color back-light. In FIG. 8, blocks 300*a*–300*g* show a back-light control signal found by the message formatter while formatting the screen to be displayed. Blocks 302*a*–302*g* correspond to the information displayed on display means 28. Blocks 304*a*–304*g* correspond to the color radiated by back-light means 30. FIG. 8 shows an example of a message which comprises seven screens of information, screens a–g. For the first screen, screen a, Block 300*a* shows no back-light control character. Screen 302*a* displays the first screen of a message and block 304*a* shows the back-lighting is off. Block 300*b* shows the second screen having a ^P character with corresponds to the color purple. Block 304*b* shows that the color purple is being radiated by the back-light means during the display of screen 302*b*. Block 300*c* shows the third screen having a ^G character which corresponds to the color light green. Block 304*c* shows that the color light green is being radiated by the back-light means during the display of screen 302*c*. Block 300*d* shows the fourth screen having a ^B character which corresponds to the color blue. Block 304*d* shows that the color blue is being radiated by the back-light means during the display of screen 302*d*. Block 300*e* shows the fifth screen having no color signal. Block 304*e* shows that the color blue from the previous screen is being radiated by the back-light means during the display of screen 302*e*. Block 300*f* shows the sixth screen having a H character which corresponds to the color dark green. Block 304f shows that the color dark green is being radiated by the back-light means during the display of screen 302*f*. Block 300*g* shows the seventh screen having a ^O character which corresponds to the back-lights being off. Block 304*g* shows that the back-light means is off during the display of screen 302*g*.

FIG. 8 shows the changing of the color of the back-light during the display of the message. Color of the back-light changes from one screen to the next screen in response to control signals embedded within the message. It should be appreciated that the changing of colors of the back-lighting with a message screen makes it possible to add additional connotations to the message read by the user of the pager.

Screens 304*a* and 304*g* show the back-light off during a portion of the message while screens 304*b*, 304*c*, 304*d*, 304*e*, and 304*f* show the back-light on during a portion of the message. Thus, FIG. 8 also shows turning the back-lighting off and on during the display of a message in response to control signals embedded within the message.

304*c* shows a light green color being emitted during the back-lighting of a portion of a message and screen 304*f* shows a dark green color being radiated during a portion of the message. Since the intensity of the back-lighting in 304*c* is greater than the intensity of the back-lighting in 304*f*, this shows changing the intensity of the back-lighting in response to control signals embedded within the message.

While only certain preferred features of the invention have been shown by way of illustration many modifications and changes will occur to those skilled in the art. It is, therefore, to be understood that the present claims are intended to cover all such modifications and changes as found within the true spirit of the invention.

What is claimed is:

1. A paging receiver comprising:

receiving means for receiving and decoding an address wherein the paging receiver has a predetermined address with a color sequence having a plurality of colors associated with the predetermined address, said receiving means generating a detect signal in response to the reception of the predetermined address; and illuminating means for generating a plurality of colors wherein said illuminating means, being responsive to the detect signal, generates a visual alert signal having a color sequence associated with the predetermined address.

2. The paging receiver of claim 1 further comprising a memory means for storing the color sequence associated with the address.

3. The paging receiver of claim 1 wherein the color sequence includes a plurality of colors for illumination by said illuminating means.

4. The paging receiver of claim 1 having a plurality of addresses, wherein each address has a unique color sequence and the plurality of color sequences include a plurality of colors generated by said illuminating means.

5. A paging receiver having a plurality of operating statuses, said paging receiver comprising:

receiving means for selectively receiving a message;

means for assigning one of a plurality of statuses to the message including an address identifying the paging receiver;

display means for displaying information indicative of the operating state of the paging receiver and for producing a state signal in response thereof, wherein the information displayed by said display means includes the received message and the operating state is responsive to the status of the displayed message; and illumination means for generating a plurality of colors wherein said illumination means selectively generates a color in response to the address.

6. The paging receiver of claim 5 wherein one of the plurality of states includes a pre-off state, during which a received message is not displayed.

7. The paging receiver of claim 5 wherein the state of the pager corresponds to the status of a message selected for display by said display means.

8. The paging receiver of claim 5 wherein the state of the pager corresponds to the status of a message displayed by said display means.

9. The paging receiver of claim 8 wherein the plurality message statuses includes a read status and a protect status.

10. The paging receiver of claim 9 wherein the plurality of states includes a read state, a protect state, a pre-protect state and a pre-delete state.

11. The paging receiver of claim 10 wherein the illuminating means illuminates a color yellow, green, alternating yellow and green, and flashing red in response to a read state signal, a protect signal, a pre-protect signal, and a pre-delete signal respectively.

12. The paging receiver of claim 5 wherein said display means is a light absorption display and said illuminating means illuminates said display means.

13. The paging receiver of claim 12 wherein said display means comprises a liquid crystal display.

* * * * *